Patented May 22, 1945

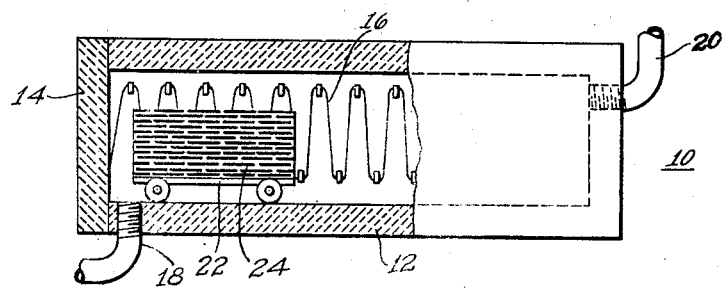
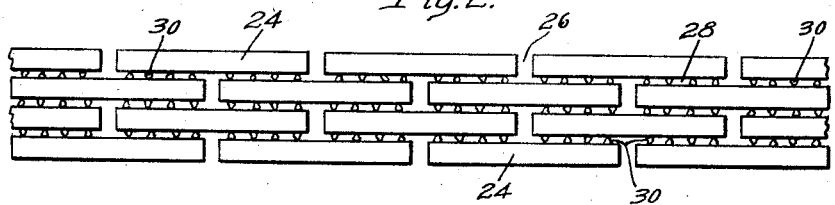
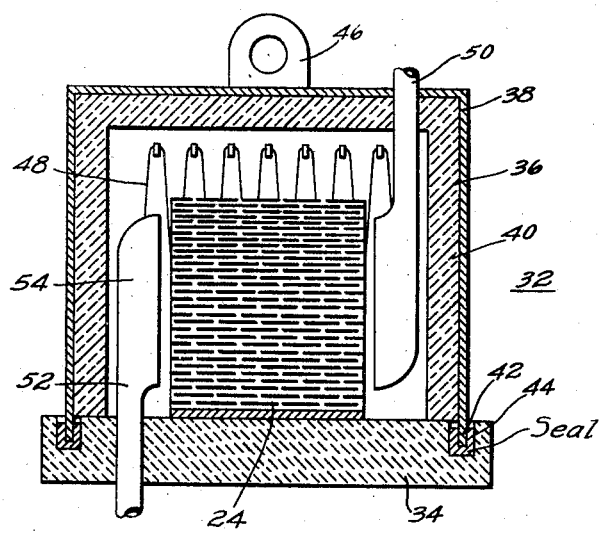

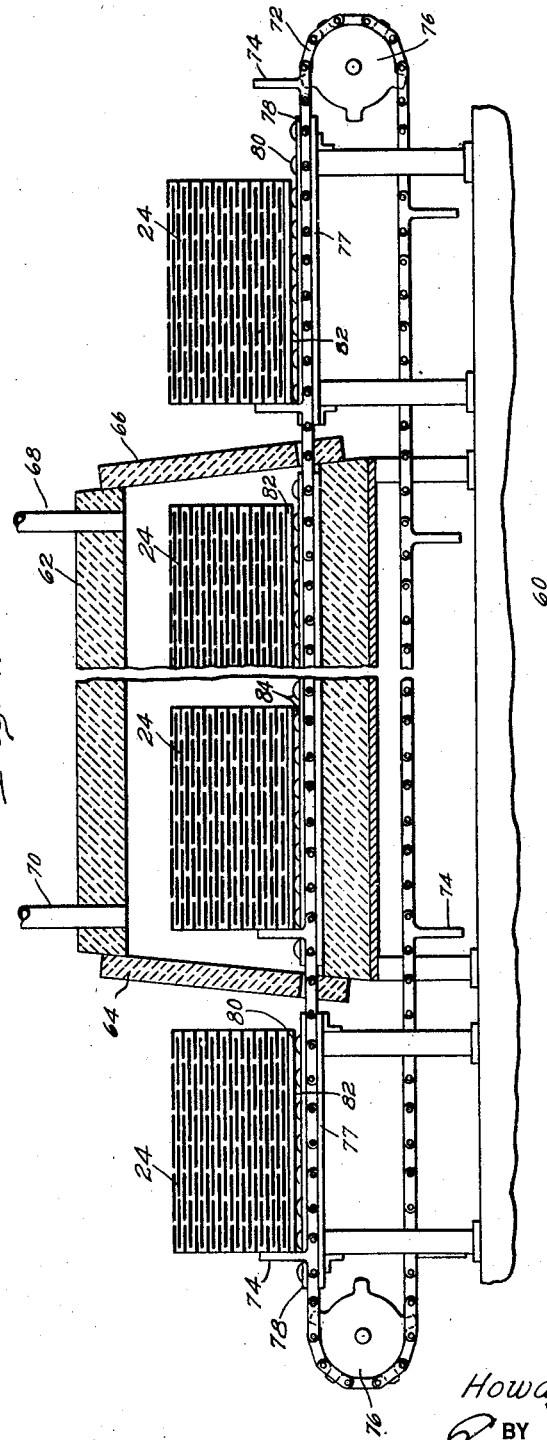

2,376,760

UNITED STATES PATENT OFFICE 2,376,760

CONTROLLED HEAT TREATMENT OF CARBON BODIES

Howard M. Elsey, Oakmont, Pa., assignor to Westinghouse Electric & Manufacturing Company, East Pittsburgh, Pa., a corporation of Pennsylvania Application July 17, 1941, Serial No. 402,885

10 Claims. (Cl. 171—325)

This invention relates to the heat treatment of carbon bodies, and more particularly carbon plates for subsequent use for brushes in electrodynamic machinery and similar applications.

In the manufacture of carbon brushes, the baking or heat treatment of molded green carbon plate is a critical step in the preparation thereof. At the present time the customary practice is to heat treat thin, molded green carbon plates by means of gas heat for a prolonged period of time of the order of 18 to 23 days. While all efforts are made to heat the carbon plates uniformly in order to develop predetermined chemical and physical properties in the plates, and to maintain substantially homogeneous characteristics throughout, the variation in the electrical and mechanical properties of the plates is relatively great. Differences of 20% in specific resistance and density between plates heat treated in the same batch are not uncommon. Accordingly, the product produced at the present time lacks the uniformity of characteristics that would be desirable for applications demanded by the electrical industry.

In addition to the wide variation in physical and chemical properties, the great length of time consumed in the baking process adds considerably to the cost of the carbon products. The prior art baking process is expensive in that large quantities of material are tied up during the prolonged baking, and the maintenance of the high temperatures called for requires relatively enormous quantities of thermal energy during the process.

The object of this invention is to provide a high speed process for heat treating carbon products in the form of plates and like articles in a controlled atmosphere to produce a uniformly carbonized product having predetermined electrical and physical characteristics.

A further object of the invention is to provide for heat treating carbon bodies in controlled atmospheres to produce predetermined porosity and to reduce the quantity of foreign materials in the final product.

Other objects of the invention will, in part, be obvious, and will, in part, appear hereinafter in the appended specification and claims.

Other objects of this invention will be apparent from the following description and drawings in which:

Figure 1 is a view partly in section of a heat treating furnace,

Fig. 2 is a fragmentary elevational view of a stack of carbon plates,

Fig. 3 is a cross-sectional view through a bell type heat treating furnace, and

Fig. 4 is a cross-sectional view through a moving belt type of furnace.

In making carbon bodies such, for example, as carbon brushes the raw material are lampblack, coke, charcoal, graphite and similar carbonaceous substances mixed in various combination and proportions. The mixture is combined with a binder such as coal tar, pitches and resins. Slugs formed from the mixture are carbonized or coked by suitable heat treatment and the carbonized slugs are pulverized to a finely divided state. After admixing the pulverized material from slugs with a binder similar to those disclosed above for slugs, and repulverizing to secure a good mechanical uniformity, the product is known as green carbon flour. This green carbon flour is then formed into bars or plates under pressures varying from 1,000 to 20,000 pounds per square inch. These bars or plates are corbonized by heat treatment at a carefully controlled temperature cycle to temperatures of about 2200° F. If properly prepared, these plates are suitable for certain applications as brushes and resistance plates in the electrical art after cutting to shape. For some purposes, it is desirable to convert the carbon in the heat-treated plates into the graphitic form. Graphitization is secured by heating the plates at extremely high temperatures of from 3000° F. up to 5500° F. This high temperature treatment will convert as much as 80% or more of the carbon into the graphitic modification. The particular electrical and physical properties such as the porosity, hardness and resistance of the brushes are determined by the heat treatment history.

According to manfacturing practice of the prior art, the plates formed from the green carbon flour under pressures varying from 1000 to 20,000 pounds per square inch are heat treated at a carefully controlled slow thermal rate of about 5° F. per hour. This slow thermal rate has been necessitated by the baking procedure which is practiced at the present time by the art.

According to prior art practice plates prepared by molding at the pressure mentioned are stacked in graphite boxes with pulverized coke poured in and around the stacked plates in order to fill up all the spaces. A plurality of boxes prepared in this manner are stacked in gas fired furnaces, and then the entire mass of boxes with plates is covered with coke, sand, or other materials to prevent excessive oxidation of the plates. The large quantities of air required to cause good combustion of the gas and to produce the high gas temperatures results in an oxidizing atmosphere which would be detrimental to exposed carbon plates. Even with all the precautions mentioned, the oxidizing atmosphere causes some "glazing" of the plates as well as cracking.

A substantial amount of the plate output is customarily scrapped due to the "glazed" surfaces produced by infiltration of oxygen, and by reason of distortion and cracking. Due to the great amount of protective material disposed above the graphite boxes and plates therein, the penetration of heat is exceedingly slow and the rate of temperature rise is accordingly low. The heating schedule of 5° F. per hour temperature rise has been found by the art to be the maximum possible for best results under the conditions stated. Depending on weather conditions and other factors, the time required to reach temperatures of 2200° F. varies from 18 to 23 days. Once this peak temperature has been reached, the green carbon plates and the binder therein have been more or less uniformly carbonized to produce a material suitable for graphitization and cutting into carbon brushes and the like.

According to this invention a more uniform product may be produced by a much more rapid heating cycle whereby green carbon plates may be heat treated in a day or less to a high grade product suitable for carbon brush manufacture. It has been discovered that by the employment of selected atmospheres, which will maintain predetermined atmospheres in and about carbon plates, that thermal rates of heating much greater than those known to the prior art may be used without causing the carbon plates to "glaze" or crack while maintaining a remarkable degree of homogeneity throughout the plates.

Instead of packing carbon plates into boxes and burying the whole in large masses of carbonaceous material, according to the process of this invention carbon plates are stocked loosely and a current of a gas of predetermined characteristics is circulated over the entire stack. The circulating gases will reduce oxidation of the carbon plates, accomplish the removal of the hydrocarbon gases arising due to carbonization and will maintain atmospheres about the plates which will produce a most uniform final product. Under such controlled atmospheres the heating rate during baking, instead of being 5° F. an hour as was practiced by the prior art, may be 45° F. an hour, 90° F. an hour, or even 360° F. an hour or higher with a final product that is entirely acceptable, and even superior to that of the prior art, for brush manufacture.

In producing controlled atmospheres, several gases have been found to give good results in the heat treatment of plates at the greatly accelerated temperatures herein indicated. Specifically the gases, nitrogen and hydrogen have been employed in furnaces producing highly satisfactory baked carbon plates. These gases are introduced into the heat treating furnace at a rate sufficient to remove the hydrocarbon gases produced by the heat treatment and to maintain a non-oxidizing atmosphere surrounding the carbon bodies. Furthermore, the circulation of the controlled atmosphere acts to creat a more uniform and rapid temperature rise as compared to the old practice of depending on conduction through a mass of loose coke or other carbon material. Accordingly, cracking due to non-uniform heating is minimized by the rapid flow of the heated gas atmosphere through the stack of carbon plates.

Other gases than hydrogen and nitrogen have been utilized as atmospheres suitable for baking carbon plates. Gaseous mixtures embodying carbon dioxide, carbon monoxide and hydrocarbons with additions of nitrogen and hydrogen may be introduced into the furnace in which the carbon bodies are being heat treated to produce members within a wide range of properties. Reducing, carburizing and decarburizing atmospheres as well as substantially neutral atmospheres are available for the process.

It has been found that the employment of a controlled gas atmosphere is particularly satisfactory when the heat treating furnace is an electrically operated unit. Various methods of heating furnaces electrically are known to the art. The employment of resistance elements of various materials for producing heat from electrical current is one well-known method. It is possible to make use of other methods of converting electrical energy to heat energy, for example, by means of induction heating and the like. The main advantage of an electrical furnace resides in the fact that the furnace may be sealed against entry of oxidizing gases and the maintenance of controlled atmospheres is thereby greatly facilitated.

For one embodiment of the invention, reference should be had to Fig. 1 of the drawings showing a furnace 10 consisting of heat insulating walls 12 and provided with an insulated door 14. Within the furnace are disposed electrical resistance heating elements 16. The furnace is provided with an inlet 18 and an exhaust 20 for the introduction and escape of gases in the maintenance of a controlled atmosphere. Carbon plates 24 are introduced into the furnace 10 upon a wheel truck 22 with suitable provision being made to protect the wheels and carriage of the truck from the effects of the high temperatures normally developed therein. Stacked upon the truck 22 are a plurality of carbon plates or other bodies 24 in such fashion that gaseous currents may pass readily between the various surfaces of the plates whereby removal of carbonization products is greatly facilitated.

Referring to Fig. 2 of the drawings, there is shown a plurality of carbon plates 24 of any suitable size loosely stacked with spaces 26 between adjacent plates in a horizontal plane and spaces 28 between plates vertically disposed about each other. In order to insure that the plates are separated from each other vertically, so that gas flow may take place over all surfaces, a layer of granular carbon dust such as coke or graphite particles 30 may be sifted over each horizontal course of plates 24.

After truck 22 has been loaded with the plates 24 in the manner indicated to insure ready penetration of the controlled atmosphere, the truck is wheeled into the furnace and the door 14 is closed. It is advisable, though not necessary, to begin the flow of a non-reacting gas such as nitrogen, hydrogen or carbon dioxide gas through inlet 18 in order to drive out the oxygen present in the furnace 10 as soon as the charge of plates has been sealed. Any suitable rate of heating of the charge may be followed within the limits of 5° F. to 360° F. per hour, or higher with good results. Due to the flow and distribution of the protective controlled gas atmosphere, each member in the stack of plates is uniformly heated by the penetration of the warm gases therethrough. Unequal expansion due to unequal temperatures in the plates is avoided. Soon after the heating has begun, the binder in the molded green carbon plates begins to decompose and to evolve hydrocarbon gases such as methane, ethane and the like. The circulating controlled atmosphere sweeps away these gases and reduces the hydrocarbon gas concentration in the vicinity of, as well as in, the carbon plates themselves. It has been discovered that the hydrocarbon gases, when heated at the high temperatures involved in the baking operation, crack within the carbon plates and deposit carbon within the pores or interstices of the plates. By reducing the hydrocarbon gas concentration, the deposition of carbon in the plates is greatly reduced. Accordingly, a nonreactive gas stream is preferred in many cases for sweeping out the entire furnace.

The quantity of nonreactive gas, which is required for the heat treatment of carbon plates, depends upon numerous factors. In the preparation of the various grades of carbon brushes, for example, different quantities and kinds of binder are employed. The amount of gases given off on the heating of the plates accordingly varies to a great extent with the binder. The amount of nonreactive gases to produce a given controlled atmosphere accordingly changes with the type of plate being heat treated. In the case where the higher thermal rates of heating are employed, greater quantities of nonreactive gases may be required to produce a given composition of atmosphere than where a slower heating rate is resorted to. Due to these various factors, no particular quantity of gas per pound of material can be set forth. To those skilled in the art, however, the quantity of nonreactive gas may be readily determined, depending on the factors embodied in the process herein disclosed.

The temperature within the furnace 10 may rise to a peak of from 1800° F. to 2200° F., depending somewhat on the subsequent operations to which carbon plates will be subjected. If the carbon plates are to be graphitized at elevated temperatures of 3000° F. to 5500° F., a peak heat treating or baking temperature of 1800° F. or even slightly less will be satisfactory. Where the carbon plates are to be cut into brushes without being graphitized, a maximum heat treatment temperature of about 2200° F. will result in a more complete carbonization of the binder and the product produced at this temperature will be more satisfactory for this latter use. Once the maximum heat treating temperature has been reached, the entire furnace may be kept at the temperature for a short period of time in order to reach equilibrium. Maintaining the peak heat treating temperature however is not critical and may be dispensed with, especially in cases where the heat treating has been effected at the relatively slower heating rates.

After the carbon plates have been completely carbonized the entire furnace load may be cooled in any convenient rate, for example, 500 to 600° F. an hour. It has been found that the introduction and flow of the nonreactive gas is not necessary during the cooling part of the cycle, since the carbon plates have completely reacted and very little change is produced therein during the relatively rapid cooling cycle. Accordingly, the introduction of the gas during the cooling part of the cycle is optional and not vital to the final product.

Thus it may be seen that carbon plates may be completely heat treated within a short period of time, for example, within eight to twenty four hours as compared to the prior art heat treatment requiring anywhere from 18 to 23 days.

Other types of furnaces may be employed for heat treating the carbon plates and other carbon bodies according to the high speed method herein disclosed.

Referring to Fig. 3 of the drawings, a bell type furnace 32 arranged for heat treating carbon plates in a controlled atmosphere is shown. The furnace 32 consists of a base 34 of suitable heat insulating material, and a bell 36. The bell 36 consists of an outer steel shell 38 and an internal heat insulating lining 40 of refractory material. The bell is sealed most effectively against atmospheric gases by means of a depending lip 42 of the steel shell 38 entering a cavity within the base 34 containing a high boiling point sealing liquid 44. Low melting temperature alloys have been found useful for the sealing liquid 44. The bell is lifted up by a crane or some similar apparatus through the means of the ear 46 attached to the shell 38. The bell part of the furnace 32 has disposed therein a plurality of electrical resistance elements 48. Also attached to the bell is an outlet member 50 for exhausting gases from within the bell. Passing through the base 34 of the furnace is a gas inlet member 52 provided with a distributing hood 54 in close proximity to the stack of carbon plates to be heat treated. The stack of carbon plates 24 may be loaded upon a metallic frame and placed upon the base 34 by a crane and thereafter the hood is placed over the stack. The same heat treating cycle as indicated for the furnace 10 will be satisfactory in the operation of furnace 32.

Both furnaces 10 and 32 are essentially batch type furnaces and the output therefrom will be discontinuous. Carbon plates may be heat treated in the high speed manner herein indicated in a moving belt continuous type furnace in which a small quantity of carbon plates will be introduced at one end of the furnace every few minutes and a similarly small quantity of completely heat treated plates will be ejected at the other end of the furnace. An example of a continuous type of furnace 60 is illustrated in Figure 4. The heat treating furnace 60 has walls 62 of suitable refractory and heat insulating material. An entry door 64 may be opened to admit small stacks of carbon plates to be heat treated, and the exit closure 66 permits completely heat treated and substantially cool plates to leave. The non-reactive gas is admitted at inlet 68 and flows countercurrent to the travel of the stacks.

Traversing over the furnace floor and extending at either end of the furnace 60 is a chain type conveyor for moving stacks of carbon plates through the furnace. The chain 72 has upstanding lugs 74 for engaging the successive stacks. A plurality of sprockets 76 driven by a suitable source of power move the chain conveyor At both the entry and exit ends of the furnace are stands 77 with support units 78 fitted with roller 30 to support stacks of carbon plates 24 on bases 82 of steel plates or the like. The rollers 80 permit easy movement of the bases 82 stacked with carbon plates into and out of the furnace 60. The furnace floor is also fitted with roller conveyor units 84 to facilitate movement of stacks 24 therethrough under the power imparted by chain 72 and lugs 74.

The heating elements in furnace 60 are arranged in a manner to give a progressive heating from the entry door 64 to the highest temperature zone in the furnace which is short of door 64 and the thermal rate of heat treatment in the plates is determined by the speed of the conveyor 72.

In continuous type furnace 60 it will be desirable to employ a current of gas passing in a direction opposite to the movement of the carbon plates. In this manner carbon plates at the cooling end of the cycle of heat treatment give up their heat to the stream of gas and the heated gas stream will assist in materially heating the carbon plates through which it traverses on its way to the gas outlet 70 adjacent the carbon plate inlet 64 of the furnace. Countercurrent flow of non-reactive gas would be particularly desirable inasmuch as the proportion of hydrocarbon gases therein is least at the highest temperatures when cracking occurs at high rates and the hydrocarbon gas concentration is a maximum at lower temperatures when thermal cracking of the gases is least.

Regardless of the type of furnace, whether continuous or the batch type, the cycle through which each carbon plate passes is substantially the same. That is, each plate is heated at a high rate while being surrounded by a flow of gases of controlled composition in order to produce both uniform heating and predetermined gaseous conditions. In this manner the plates will produce a uniform product which has so far not been obtainable in the prior art.

As an example of the results obtainable with the high speed heat treatment indicated herein, the following three series of ten carbon plates each were prepared from the same base material and were baked at temperature rates of 90° F. per hour and at 360° F. per hour.

TABLE I

| | Resistance, ohms/in.³ | Density | Baking loss |
|---|---|---|---|
| | | | Per cent |
| Average for 360° F./hr | .00230 | 1.478 | 15.3 |
| Average for 90° F./hr | Test I .00242 | 1.470 | 15.3 |
| Average for 90° F./hr | Test II .00245 | 1.467 | 15.2 |

In these tests embodied in Table I plates as large as 12″ x 5″ x ½″ were baked at the rates indicated without signs of cracking or warping out of shape.

In addition to heat-treating ordinary green carbon, the high speed heat treating cycle has been applied to green carbon plates containing a distribution of a volatilizable material which will evaporate and disappear at temperatures below that at which the plates are completely carbonized. As disclosed in the patent application, Serial No. 366,924, entitled "Hydrocarbon gas treatment for electrographitic material," by Lawrence E. Moberly, filed November 23, 1940, now Patent 2,282,235 issued May 5, 1942, various readily volatilized materials such as urea and ammonium carbonate in selected grain sizes may be incorporated into the normal green carbon to be consolidated into plates whereby upon heat treatment the volatilizable material escapes and leaves a porous plate structure behind.

In one case carbon plates were molded with 15% by weight of 60-mesh urea crystals distributed therein. The urea containing green carbon plates had an apparent density of 1.37 to 1.39. The baking of the carbon plates containing urea effected along a modified high speed cycle as follows: 18° F. per hour to 500° F. and thereafter 90° F. per hour to the maximum temperature. Up to the temperature at which all of the urea had volatilized and escaped, the baking may be carried on from a rate of temperature rise of 5° F. per hour up to approximately 25° F. per hour. The thermal rate depends to some extent on the relative amount of gases developed by the volatilization of the urea. The relatively slow thermal rate at this stage is necessary to prevent the destruction of the carbon plates by excessive gas formation. When a temperature of about 500° F. has been reached, substantially all of the urea has been volatilized leaving behind the porous carbon structure. Thereafter the carbon bodies may be heat treated at an accelerated rate of up to 360° F. per hour or higher. The carbon plates prepared from a 15% urea distribution had a final apparent density of 1.215 and a specific resistance of 0.00315 as a means for eight plates. The same green carbon without the addition of urea had an apparent density of 1.44 and a specific resistance of 0.0028.

While, for most commercial purposes, the heat treatment of carbon plates in an atmosphere containing gases which are substantially nonreactive with the carbon produces the most desirable results, atmospheres in which carbon plates are baked may be modified to produce different densities and electrical resistance in the final heat treated plates for meeting industrial requirements. For example, instead of employing non-reactive atmospheres which consist mainly of the hydrogen, nitrogen or carbon dioxide gases herein disclosed, atmospheres consisting of hydrocarbon gases such as methane, propane, butane, and similar hydrocarbon gases which will crack at the elevated heat treating temperatures and deposit carbon within the interstices of the carbon plates may be made use of to modify the properties of the carbon plates. In this manner a single raw green carbon material may be employed for preparing carbon brushes having a wide range of properties. By subjecting the single plate material to treatment in atmospheres modified in this manner, the resultant carbonized plates may be produced with either gain or loss in weight and gain or loss in specific resistance and density. By properly controlling the proportions and quantities of the several gases introduced into the heat treating furnace, as well as modifying the baking time, the resultant plates may have a specific resistance varying in a ratio greater than 2 to 1. The hardness and density of the final product may likewise be varied to produce a material that is suitable for meeting the requirements of electrical apparatus of all kinds. The following table is an example of what may be achieved by heat treating plates of an identical green carbon flour in several types of atmospheres to produce a remarkable variation in the resultant properties. It will be appreciated that while the carbon plates vary so radically from each other when subjected to different heat treatment atmospheres, nevertheless the carbon plates within any one batch of material have a remarkable uniformity which has not been achieved heretofore in the prior art.

of the same green carbon flour as was used for preparing sample BF87.

TABLE II

*Results of baking 457 plates in a controlled gas atmosphere at 25° C./hr.*

| Sample | Baking wt. loss (—) or gain (+) | Graphitized bar | | Compressed powder | | |
|---|---|---|---|---|---|---|
| | | Resistance | App. density | Resistance | App. density | |
| | Per cent | Ohms/in.³ | | Ohms/in.³ | | |
| BM11-1 | +8.4 | .00157 | 1.61 | .00176 / .00174 | 2.15 / 2.13 | Baked in propane to 950° C. and graphitized at 2500° C. |
| BM11-2 | −18.2 | .00343 | 1.31 | .00210 / .00210 | 2.12 / 2.10 | Baked in nitrogen to 950° C. and graphitized at 2500° C. |
| BM16 | −19.9 | .00317 | 1.34 | .00214 / .00219 | 2.09 / 2.12 | Baked in hydrogen to 950° C. and graphitized at 2500° C. |
| BM9-1 | −17.0 | .00314 | 1.35 | | | Baked in nitrogen to 950° C. (200° C./hr.) and graphitized at 2500° C. |
| BM9-2 | −19.2 | .00344 | 1.32 | | | Baked in nitrogen+carbon dioxide to 950° and graphitized at 2500° C. |
| BM3-1 | −18.3 | .00334 | 1.33 | | | Baked in nitrogen to 950° C. and graphitized at 2500° C. |
| BM3-2 | −1.8 | .00195 | 1.50 | .00178 / .00177 | 2.10 / 2.12 | Baked in nitrogen+propane to 950° C. and graphitized at 2500° C. |
| BM13 | +10.4 | .00166 | 1.58 | .00215 / .00217 | 2.08 / 2.08 | Baked at 25° C./hr. while packed in coke then baked in propane and graphitized at 2500° C. |
| XAC-U | | .00311 | 1.35 | | | Porous brush (ammonium carbonate) baked while packed in coke and graphitized. |
| XAC-T | | .00220 | 1.45 | | | As above with an added bake in propane. |

The above Table II is merely indicative of the modifications in the properties of the carbon plates that can be secured by controlling the atmosphere in which the carbon plates are baked. The gain or loss in the baking weight may be controlled to such a degree so that any particular baked weight may be secured. Thus, the dilution of propane gas with various amounts of an inert gas such as nitrogen, may be effected to produce a baking weight gain or loss of almost any amount from zero per cent and upward.

While it is obvious from the above that the properties of the green carbon plates may be modified as respects density and specific resistance, other desirable results have been accomplished by flowing gas atmosphere over loosely stacked carbon plates as compared to the prior art heat treatment. Carbon brushes frequently give unsatisfactory service due to the fact that sulphur in the sulfide form is present in brushes formed from plates which have been heat treated while embedded in large masses of carbonaceous material. When carbon plates are heat treated according to this invention, the flow of controlled gas atmosphere greatly reduces the quantity of sulfide sulphur present in the brushes. This reduction is so great that the difficulty associated with standard brushes with respect to this particular impurity is practically eliminated. Furthermore, the ash content of the carbon brushes is greatly reduced by heat treatment in the controlled atmosphere. The following table is illustrative of the improvement respecting impurities in carbon brushes:

| Sample | Total ash | Sulfide sulphur | Total sulphur |
|---|---|---|---|
| | Per cent | Per cent | Per cent |
| BF87 | .32 | .045 | .059 |
| TN10 | .28 | .008 | .017 |
| N10 | .004 | .000 | .000 |

After being subjected to graphitization, the sample BF87 which was produced by baking while embedded in carbonaceous material in the prior art process, contained the above quantities of ash and sulphur.

Sample TN10 was baked in a nitrogen atmosphere at the rate of 90° F. per hour and was graphitized at a temperature slightly below 2800° C. per hour. The sample TN10 consisted Sample N10, which was prepared from green carbon flour of the same type as used in the two previous samples, was baked in nitrogen at the rate of 90° F. per hour, and graphitized in a high frequency induction furnace at 2800° C. This sample had a zero sulphur content.

Brushes which have been prepared by heat treatment in controlled atmospheres accordingly will contain negligible amounts of sulfide sulphur. When such brushes are used with copper commutators on motors, for example, the commutators will remain clean and not corrode as compared to commutators which form dark corrosion films when run in contact with brushes having high sulfide sulphur content. The contact resistance of this latter type of commutator with corrosion products on the surface is noticeably greater and produces material changes in the performance characteristics of electrical equipment.

The achievement of a high speed carbonization of carbon plates, as indicated in this invention, constitutes a vital advance over the prior art. Scrap and processing losses are materially lowered concurrent with more economical processing. Respecting the properties of the material there is a notable increase in uniformity between the plates in each stack as well as between portions of the same plate and this process has eliminated one of the major problems in carbon brush manufacture. The accurate control of the final product is a valuable contribution to the manufacture of carbon members for use in all types of equipment. Accordingly the method herein disclosed will introduce significant economies into carbon brush manufacture in addition to providing a material which will meet engineering standards to a greater degree than was heretofore thought possible.

Wile the specific details of this disclosure have been more or less closely related to the production of carbon brushes for electrical purposes, the carbonaceous bodies produced by the controlled atmosphere heat treatment are likewise suitable for use in other applications. For example, graphite crucibles, packing column material of various types and other chemically resistant members for use in the chemical industry, resisting plates, carbon electrodes, graphitic anodes and numerous other items may be made in the above described manner whereby more suitable products for the specific purpose intended are achieved. The rapid heat treatment of such carbonaceous bodies by the process described will result in considerable savings over prior art treatment.

While several specific examples of the process embodying this invention have been disclosed, it is to be understood that the process can be modified in various manners without departing from the scope of the invention except as is necessitated by the prior art and is defined by the appended claims.

I claim as my invention:

1. The process of heat treating green carbon plates to cause carbonization thereof and to provide for predetermined electrical properties in the heat treated plates which comprises, in combination, heating the green carbon plates at a thermal gradient of from above 5° F. per hour to 360° F. per hour or higher to a predetermined heat treating temperature and flowing substantially non-oxidizing gas over the carbon plates to provide for substantially uniform carbonization and to produce controlled gaseous conditions within and about the carbon plates, the carbon plates retaining their shape substantially without injurious warpage during the heat treatment.

2. The process of heat treating green carbon plates to cause carbonization thereof and to provide for predetermined electrical properties in the heat treated plates which comprises, in combination, heating the green carbon plates at a thermal gradient of from above 5° F. per hour to 360° F. per hour or higher to a predetermined heat treating temperature and flowing a substantially nonreactive gas over the carbon plates to provide for substantially uniform carbonization and to produce controlled gaseous conditions within and about the carbon plates, the carbon plates retaining their shape substantially without injurious warpage during the heat treatment.

3. The process of heat treating green carbon plates to cause carbonization thereof and to provide for predetermined electrical properties in the heat treated plates which comprises, in combination, heating the green carbon plates at a thermal gradient of from above 5° F. per hour to 360° F. per hour or higher to a predetermined heat treating temperature and flowing over the carbon plates a substantially nonreactive gas selected from the group consisting of nitrogen, hydrogen and carbon dioxide, to provide for substantally uniform carbonization and to produce controlled gaseous conditions within and about the carbon plates, the carbon plates retaining their shape substantially without injurious warpage during the heat treatment.

4. The process of heat treating green carbon plates to cause carbonization thereof and to provide for predetermined electrical properties in the heat treated plates which comprises, in combination, heating the green carbon plates at a thermal gradient of from above 5° F. per hour to 360° F. per hour or higher to a predetermined heat treating temperature and flowing over the carbon plates a hydrocarbon gas which will crack during the heating to produce carbon deposition to provide for substantially uniform carbonization and to produce controlled gaseous conditions within and about the carbon plates, the carbon plates retaining their shape substantially without injurious warpage during the heat treatment.

5. The method of rapidly heat treating compressed green carbon bodies to cause carbonization thereof substantially without harmful deformation of the bodies and to provide for predetermined physical and electrical properties, which comprises flowing a controlled gas atmosphere substantially free of oxidizing gases over the green carbon bodies while heating the bodies at a high thermal rate to predetermined heat treating temperature.

6. The method of rapidly heat treating compressed green carbon bodies to cause carbonization thereof substantially without harmful deformation of the bodies and to provide for predetermined physical and electrical properties, which comprises flowing a controlled gas atmosphere consisting of substantially nonreactive gases selected from the group nitrogen, hydrogen and carbon dioxide over the green carbon bodies while heating the bodies at a high thermal rate to predetermined heat treating temperature.

7. The process of heat treating green carbon bodies to cause carbonization thereof and to provide for predetermined electrical and physical properties in the heat treated bodies which comprises, in combination, heating the green carbon bodies at a thermal gradient of from above 5° F. per hour to 360° F. per hour or higher to a predetermined heat treating temperature, maintaining the carbon bodies at the predetermined temperature for a period of time, flowing a substantially non-oxidizing gas over the carbon bodies while heating to provide for substantially uniform carbonization and to produce selected gaseous conditions within and adjacent the carbon bodies, and cooling the bodies, the carbon bodies retaining their shape substantially without injurious warpage during the heat treatment.

8. The method of heat treating green carbon plates to cause carbonization thereof and to provide a predetermined uniformity in the heat treated plates which comprises, in combination, stacking the green carbon plates to provide for good gas flow, heating the stacked green carbon plates at a rate to cause the temperature to rise from above 5° F. per hour to 360° F. or higher per hour to a temperature above about 1750° F. and flowing a substantially non-oxidizing gas through the stacked carbon plates, the carbon plates retaining their shape substantially without injurious warping under the thermal gradient.

9. The method of heat treating compressed green carbon bodies to cause carbonization thereof for subsequent use as carbon brushes, the carbon brushes being characterized by a substantial absence of sulphur in the detrimental sulfide form, which comprises heating treating the carbon bodies up to a temperature of the order of 1800° F. in a circulated atmosphere composed of substantially nonreacting gases, the gases being removed as sulphur accumulates therein and fresh gas being added.

10. The method of heat treating molded carbon bodies containing a distribution of readily volatilizable material therein at a high thermal rate to produce a uniformly carbonized product having a porous structure due to the removal of the volatilizable material which comprises heating the molded carbon bodies at a thermal rate of from 5° F. to 25° F. per hour up to a temperature at which the volatilizable material has been converted into gases and has escaped from the carbon bodies, increasing the rate of heating of the carbon bodies when the volatilizable material has escaped to a higher thermal rate of from 5° F. to 360° F. per hour or higher to a predetermined carbonization temperature, and flowing a substantially nonreactive gas over the carbon bodies to remove the gases produced and to provide for a predetermined gas atmosphere in and around the carbon bodies whereby predetermined physical and chemical characteristics are obtained.

HOWARD M. ELSEY.